(12) United States Patent
Jiang et al.

(10) Patent No.: US 11,888,342 B2
(45) Date of Patent: Jan. 30, 2024

(54) BI-DIRECTIONAL BATTERY CHARGING CIRCUIT WITH VOLTAGE REGULATION CONTROL

(71) Applicant: Monolithic Power Systems, Inc., San Jose, CA (US)

(72) Inventors: Yuncong Jiang, Santa Clara, CA (US); Christian Sporck, Campbell, CA (US); Guanghui Li, Chengdu (CN)

(73) Assignee: Monolithic Power Systems, Inc., San Jose, CA (US)

( * ) Notice: Subject to any disclaimer, the term of this patent is extended or adjusted under 35 U.S.C. 154(b) by 550 days.

(21) Appl. No.: 17/136,980

(22) Filed: Dec. 29, 2020

(65) Prior Publication Data

US 2021/0359534 A1    Nov. 18, 2021

Related U.S. Application Data

(60) Provisional application No. 63/023,852, filed on May 12, 2020.

(51) Int. Cl.
| | |
|---|---|
| *H02J 7/00* | (2006.01) |
| *G06F 1/30* | (2006.01) |
| *H02J 9/06* | (2006.01) |
| *H02M 3/158* | (2006.01) |

(52) U.S. Cl.
CPC ............ *H02J 7/00714* (2020.01); *G06F 1/30* (2013.01); *H02J 7/0013* (2013.01); *H02J 9/06* (2013.01); *H02J 2207/20* (2020.01); *H02M 3/1582* (2013.01)

(58) Field of Classification Search
CPC ........ H02J 7/00714; H02J 7/0013; H02J 9/06; G06F 1/30
USPC .......................................................... 320/164
See application file for complete search history.

(56) References Cited

U.S. PATENT DOCUMENTS

| | | | |
|---|---|---|---|
| 7,098,557 B2* | 8/2006 | Swanson .................. | H02J 7/345 307/66 |
| 7,355,303 B2* | 4/2008 | Swanson .................. | H02J 9/061 307/66 |
| 7,733,670 B2* | 6/2010 | Feng .................. | H02M 3/33584 363/37 |
| 7,962,787 B2* | 6/2011 | Camilleri ............ | G06F 11/1441 714/24 |
| 8,482,155 B2* | 7/2013 | Choi ....................... | H02M 7/49 307/82 |

(Continued)

*Primary Examiner* — John T Trischler
(74) *Attorney, Agent, or Firm* — Perkins Coie LLP

(57) ABSTRACT

An electric system has an input terminal to receive an input voltage, a system output terminal to provide a system voltage, and N charging units for charging N loads respectively. The electric system has an input switch coupled between the input terminal and a first terminal, a switching circuit coupled between the first terminal and the system output terminal. The switching circuit converts the a boost output voltage at the first terminal to the system voltage, or converts the system voltage to the boost output voltage. The electric system further has a voltage control module having N input terminals coupled to the N charging units respectively, the voltage control module senses N charging currents passing through the N charging units respectively, and adjusts the boost output voltage based on the N charging currents.

16 Claims, 8 Drawing Sheets

(56) References Cited

U.S. PATENT DOCUMENTS

| | | | | |
|---|---|---|---|---|
| 8,552,590 B2* | 10/2013 | Moon | H02J 3/32 | 307/64 |
| 8,558,510 B2* | 10/2013 | Moon | H02J 3/144 | 320/140 |
| 8,569,998 B2* | 10/2013 | Shim | H01M 10/482 | 307/65 |
| 8,581,551 B2* | 11/2013 | Seo | G06F 1/26 | 320/101 |
| 8,716,891 B2* | 5/2014 | Choi | H02J 3/381 | 307/71 |
| 8,766,590 B2* | 7/2014 | Lee | H02J 7/34 | 700/297 |
| 8,773,076 B2* | 7/2014 | Choi | H02J 3/32 | 320/139 |
| 8,808,886 B2* | 8/2014 | Kim | H02J 7/0016 | 338/68 |
| 8,938,323 B2* | 1/2015 | Lee | G06F 1/30 | 700/297 |
| 9,041,354 B2* | 5/2015 | Lee | H02J 7/35 | 320/140 |
| 9,219,366 B2* | 12/2015 | Kim | H02J 7/00 | |
| 9,236,790 B2* | 1/2016 | Inakagata | H02J 1/102 | |
| 9,300,326 B2* | 3/2016 | O'Brien | H04B 7/0413 | |
| 9,306,415 B2* | 4/2016 | Shin | H02J 9/00 | |
| 9,438,049 B2* | 9/2016 | Xiang | H02J 7/00304 | |
| 9,444,280 B2* | 9/2016 | Lee | H02M 7/44 | |
| 9,653,928 B2* | 5/2017 | Shim | H01M 50/569 | |
| 9,882,405 B2* | 1/2018 | Xu | H02J 9/061 | |
| 9,906,059 B2* | 2/2018 | Hang | H02J 7/0068 | |
| 10,063,078 B2* | 8/2018 | Xu | H02J 9/00 | |
| 10,778,099 B1* | 9/2020 | Womac | H02M 1/32 | |
| 10,790,737 B2* | 9/2020 | Luo | H02M 1/32 | |
| 10,992,169 B2* | 4/2021 | Fukae | B60R 16/033 | |
| 11,108,256 B2* | 8/2021 | Sporck | H02J 7/0071 | |
| 11,301,018 B2* | 4/2022 | Hsieh | H02J 9/061 | |
| 11,342,775 B2* | 5/2022 | Schiff | G06F 1/263 | |
| 11,472,668 B2* | 10/2022 | Sirigu | H02J 9/06 | |
| 11,489,357 B2* | 11/2022 | Chang | H02J 7/007182 | |
| 11,601,007 B2* | 3/2023 | Suzuki | H02J 7/0013 | |
| 11,664,675 B2* | 5/2023 | Inai | G06F 1/263 | 307/142 |
| 2004/0010649 A1* | 1/2004 | Weaver | H02J 9/00 | 307/66 |
| 2004/0227494 A1* | 11/2004 | Swanson | H02J 7/345 | 323/268 |
| 2006/0132102 A1* | 6/2006 | Harvey | G05F 1/67 | 320/166 |
| 2006/0290207 A1* | 12/2006 | Swanson | H02J 7/345 | 307/66 |
| 2008/0062724 A1* | 3/2008 | Feng | H02J 7/35 | 307/66 |
| 2008/0231233 A1* | 9/2008 | Thornton | G06F 1/263 | 320/137 |
| 2009/0144576 A1* | 6/2009 | Camilleri | G06F 1/24 | 713/340 |
| 2009/0193278 A1* | 7/2009 | Camilleri | G06F 11/1441 | 713/340 |
| 2011/0115295 A1* | 5/2011 | Moon | H02J 3/32 | 307/65 |
| 2011/0140535 A1* | 6/2011 | Choi | H02J 3/32 | 307/82 |
| 2011/0140648 A1* | 6/2011 | Lee | H02J 3/32 | 307/66 |
| 2011/0140667 A1* | 6/2011 | Moon | H02J 7/00716 | 320/134 |
| 2011/0144822 A1* | 6/2011 | Choi | H02J 3/381 | 700/297 |
| 2011/0148195 A1* | 6/2011 | Lee | H02J 7/35 | 307/25 |
| 2011/0148205 A1* | 6/2011 | Moon | H02J 9/062 | 307/65 |
| 2011/0175564 A1* | 7/2011 | Shim | H01M 10/482 | 320/101 |
| 2011/0208370 A1* | 8/2011 | Lee | G06F 1/30 | 700/297 |
| 2011/0304212 A1* | 12/2011 | Choi | H02M 7/48 | 307/66 |
| 2012/0086269 A1* | 4/2012 | Nakano | H02J 9/062 | 307/23 |
| 2012/0086404 A1* | 4/2012 | Lim | H02J 7/00304 | 320/128 |
| 2012/0091965 A1* | 4/2012 | Seo | H02J 7/342 | 320/128 |
| 2012/0094151 A1* | 4/2012 | Kim | H02J 7/007194 | 429/61 |
| 2012/0200264 A1* | 8/2012 | Choi | H02J 7/0048 | 320/132 |
| 2012/0205985 A1* | 8/2012 | Inakagata | H02J 3/46 | 307/82 |
| 2013/0169046 A1* | 7/2013 | Shin | H02J 9/00 | 307/66 |
| 2013/0229841 A1* | 9/2013 | Giuliano | H02M 3/158 | 363/60 |
| 2014/0002003 A1* | 1/2014 | Kim | H02J 7/0019 | 429/61 |
| 2014/0028245 A1* | 1/2014 | Shim | H02J 7/00036 | 320/106 |
| 2014/0117944 A1* | 5/2014 | O'Brien | H04B 7/0413 | 320/158 |
| 2014/0239903 A1* | 8/2014 | Choi | H01M 10/637 | 320/128 |
| 2014/0285155 A1* | 9/2014 | Choi | H02J 7/02 | 320/134 |
| 2015/0123480 A1* | 5/2015 | Xu | H02J 7/0068 | 307/66 |
| 2015/0380968 A1* | 12/2015 | Lee | G06F 1/30 | 713/300 |
| 2016/0056657 A1* | 2/2016 | Hang | H02J 7/0068 | 320/128 |
| 2017/0085122 A1* | 3/2017 | Nasiri | A61B 6/56 | |
| 2017/0187214 A1* | 6/2017 | Xu | H02M 3/1582 | |
| 2018/0241306 A1* | 8/2018 | Takahashi | H02M 1/36 | |
| 2019/0334429 A1* | 10/2019 | Luo | H02M 1/08 | |
| 2019/0348846 A1* | 11/2019 | El Markhi | H02J 7/00 | |
| 2019/0372358 A1* | 12/2019 | El Markhi | H02J 7/00304 | |
| 2020/0148507 A1* | 5/2020 | Sirigu | B66B 5/0025 | |
| 2020/0185949 A1 | 6/2020 | Chang | | |
| 2020/0227933 A1* | 7/2020 | Schiff | H02M 3/1582 | |
| 2020/0259363 A1* | 8/2020 | Fukae | B60R 16/03 | |
| 2020/0266647 A1* | 8/2020 | Ramachandran | H01M 10/48 | |
| 2020/0313444 A1* | 10/2020 | El Markhi | H02J 7/00302 | |
| 2020/0379536 A1* | 12/2020 | Hsieh | G06F 1/30 | |
| 2021/0036524 A1* | 2/2021 | Womac | H02J 7/00 | |
| 2021/0036533 A1* | 2/2021 | Sporck | H02J 7/0071 | |
| 2022/0094191 A1* | 3/2022 | Suzuki | H02J 1/102 | |
| 2022/0102996 A1* | 3/2022 | Sporck | H02M 3/1586 | |
| 2022/0102999 A1* | 3/2022 | Sporck | H02J 7/007182 | |
| 2022/0103006 A1* | 3/2022 | Inai | H02J 9/06 | |
| 2022/0231530 A1* | 7/2022 | Mori | H02J 7/0047 | |
| 2022/0294248 A1* | 9/2022 | Xu | H02M 3/155 | |
| 2022/0337069 A1* | 10/2022 | Sporck | H02J 7/0068 | |

* cited by examiner

US 11,888,342 B2

BI-DIRECTIONAL BATTERY CHARGING CIRCUIT WITH VOLTAGE REGULATION CONTROL

CROSS-REFERENCE TO RELATED APPLICATIONS

This application claims the benefit of U.S. Provisional Application No. 63/023,852, filed on May 12, 2020, which is incorporated herein by reference in its entirety.

TECHNICAL FIELD

This disclosure generally relates to a battery charging circuit, and more particularly but not exclusively relates to a bi-directional battery charging circuit.

BACKGROUND

Today, more and more battery charging systems are designed to charge a main battery and multiple battery cells. Moreover, a battery charging system usually has a bi-directional switching circuit that can work in a buck mode or a boost mode. When there is a power source for the battery charging system, the bi-directional switching circuit works in the buck mode to transfer energy from the power source to the main battery and the multiple battery cells, and when there is no power source, the bi-directional switching works in the boost mode to transfer energy from the main battery to the multiple battery cells.

During the energy transfer process from the main battery to the multiple battery cells, charging variables, such as charging voltage and charging current are carefully controlled in order to better control the charging process. Usually, the charging voltage has a preset value and can not be adjusted with the charging current, so the charging efficiency is low, especially when the charging voltage has a relative high preset value.

Therefore, it is desired to provide a battery charging system that can adjust the charging voltage based on the charging current to improve the charging efficiency.

SUMMARY

In accomplishing the above and other objects, there has been provided an electric system comprising an input terminal to receive an input voltage, a system output terminal to provide a system voltage, and N charging output terminals coupled to N loads respectively, wherein N is an integer greater than or equal to 1. The electric system comprises an input switch coupled between the input terminal and a PMID terminal, a switching circuit coupled between the PMID terminal and the system output terminal, N charging units and a voltage control module having N input terminals coupled to the N charging units respectively. Wherein the switching circuit is configured to work in a buck mode to convert the voltage received at the PMID terminal to the system voltage, or to work in a boost mode to convert the system voltage to a boost output voltage at the PMID terminal. Wherein for each i from 1 to N, i is an integer in a range from 1 to N, the $i^{th}$ charging unit of the N charging units has an input terminal coupled to the PMID terminal, and an output terminal coupled to the $i^{th}$ charging output terminal of the N charging output terminals for charging the $i^{th}$ load of the N loads. Wherein the voltage control module is configured to sense N charging currents passing through the N charging units respectively and to adjust the boost output voltage based on the N charging currents.

There has also been provided a method for controlling an electric system. The electric system has an input terminal to receive an input voltage, a system output terminal to provide a system voltage, an input switch coupled between the input terminal and a PMID terminal, and a switching circuit coupled between the PMID terminal and the system output terminal. The switching circuit is configured to work in a buck mode to convert the voltage received at the PMID terminal to the system voltage or to work in a boost mode to convert the system voltage to a boost output voltage at the PMID terminal. The electric system further comprises N charging units for charging N loads respectively, wherein N is an integer greater than or equal to 1, and for each i from 1 to N, wherein i is an integer in a range from 1 to N, the $i^{th}$ charging unit has an input terminal coupled to the PMID terminal, and an output terminal coupled to the $i^{th}$ load of the N loads. The method comprises the steps of setting the boost output voltage to be an initial voltage, sensing N charging currents passing through the N charging units respectively and adjusting the boost output voltage based on the N charging currents.

There has also been provided a method for controlling an electric system. The electric system has an input terminal to receive an input voltage, a system output terminal to provide a system voltage, an input switch coupled between the input terminal and a PMID terminal, and a switching circuit coupled between the PMID terminal and the system output terminal. The switching circuit is configured to convert the voltage received at the PMID terminal to the system voltage or to convert the system voltage to a boost output voltage at the PMID terminal. The electric system further comprises N charging units for charging N loads respectively, wherein N is an integer greater than or equal to 1, and for each i from 1 to N, wherein i is an integer in a range from 1 to N, the $i^{th}$ charging unit has an input terminal coupled to the PMID terminal, and an output terminal coupled to the $i^{th}$ load of the N loads. The method comprises the steps of sensing N charging currents passing through the N charging units respectively, generating a first error signal based on the minimum one of the N charging currents and a fast charge reference current, generating a second error signal based on a reference voltage and a feedback voltage indicative of the boost output voltage, and generating a switching control signal to control the switching circuit based on the first error signal or the second error signal.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

Figure 1:
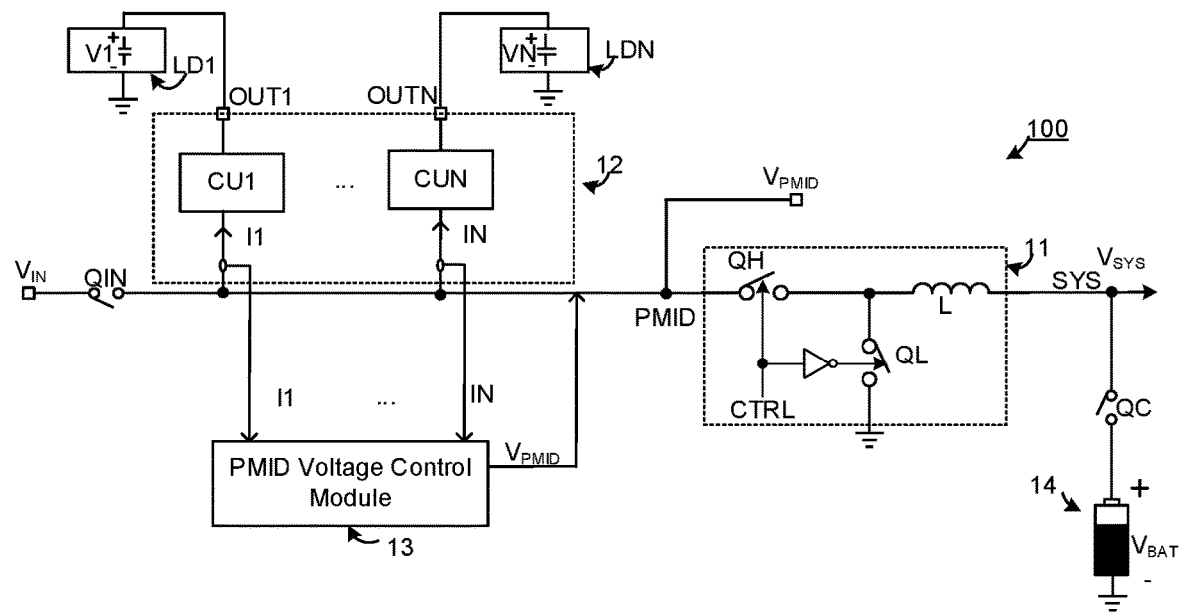
FIG. 1 illustrates a schematic diagram of an electric system 100 in accordance with an embodiment of the present invention.
Figure 5:
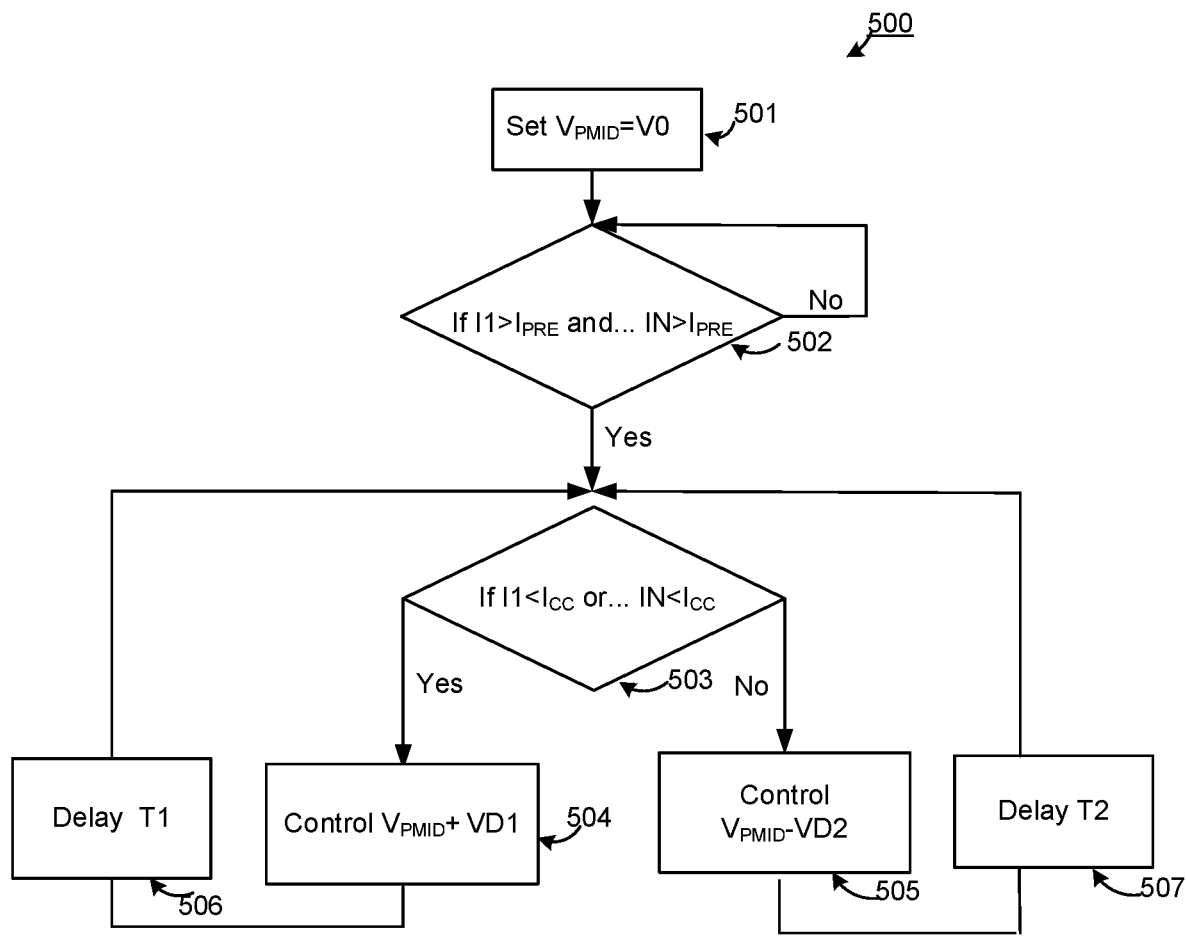

FIG. 5 illustrates a flowchart of a method 500 used by the PMID voltage control module 13 of the electric system 100 shown in FIG. 1 in accordance with an embodiment of the present invention.

Figure 6:
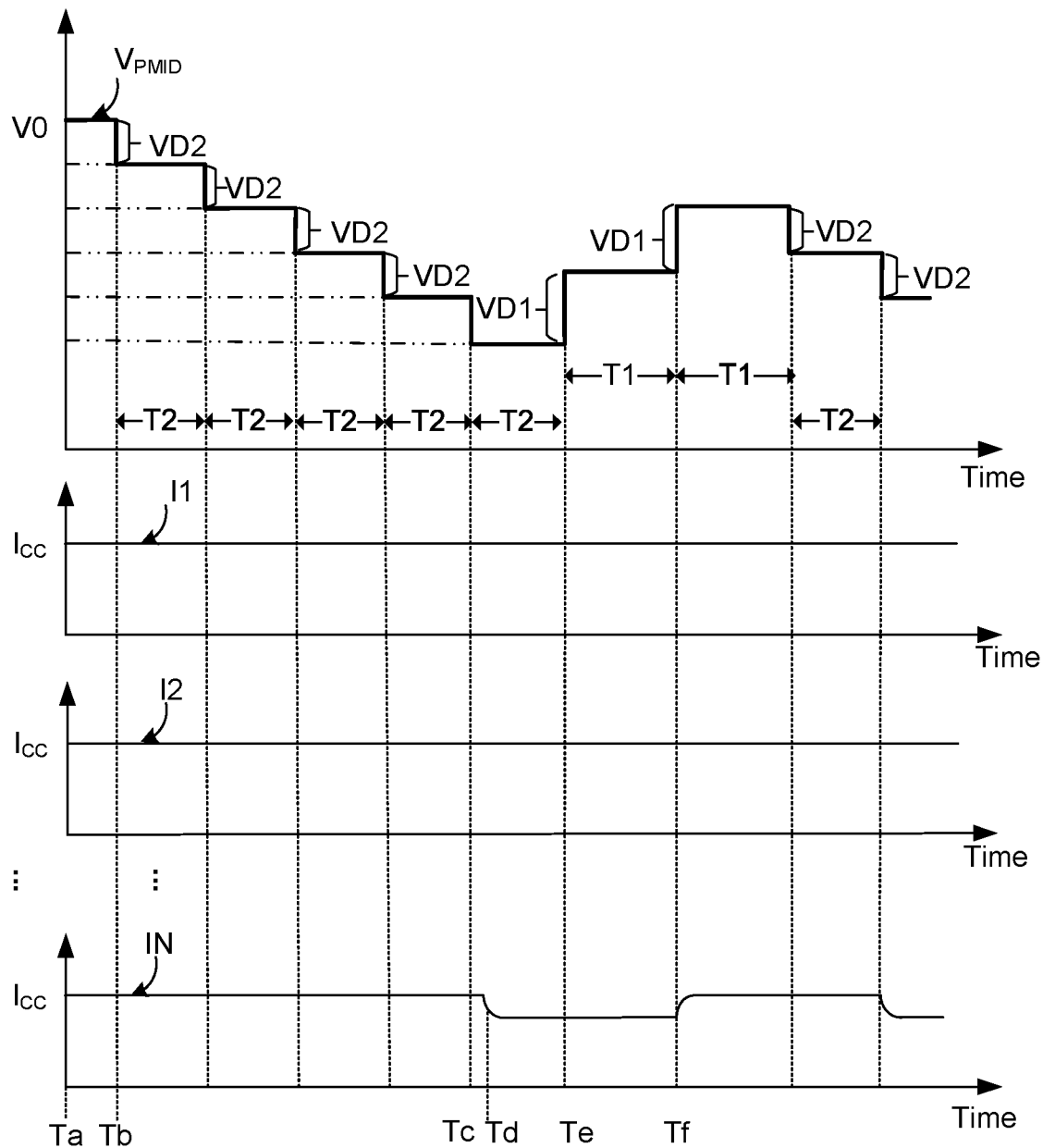

FIG. 6 illustrates the waveform diagrams of a series of signals of the method 500 in FIG. 5 in accordance with an embodiment of the present invention.

Figure 7A:
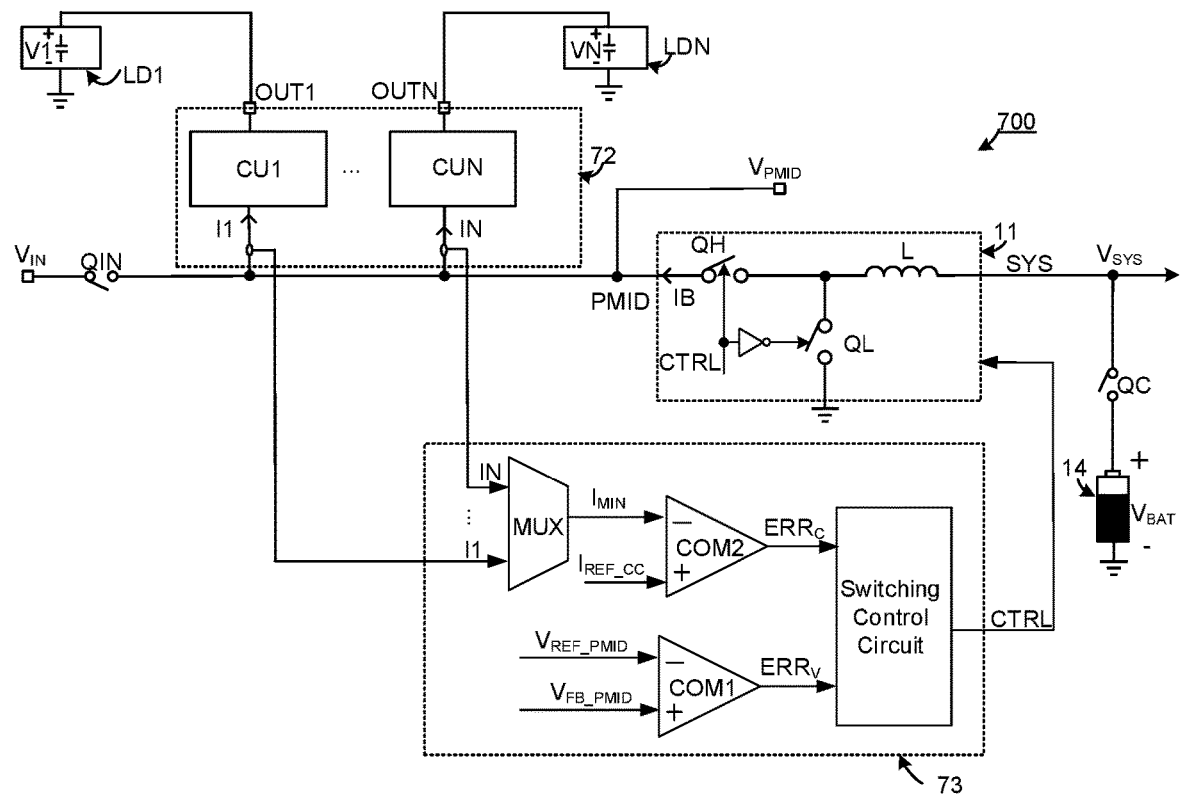

FIG. 7a illustrates the electric system 700 with a schematic diagram of the voltage control module 13 in accordance with an embodiment of the present invention.

Figure 7B:
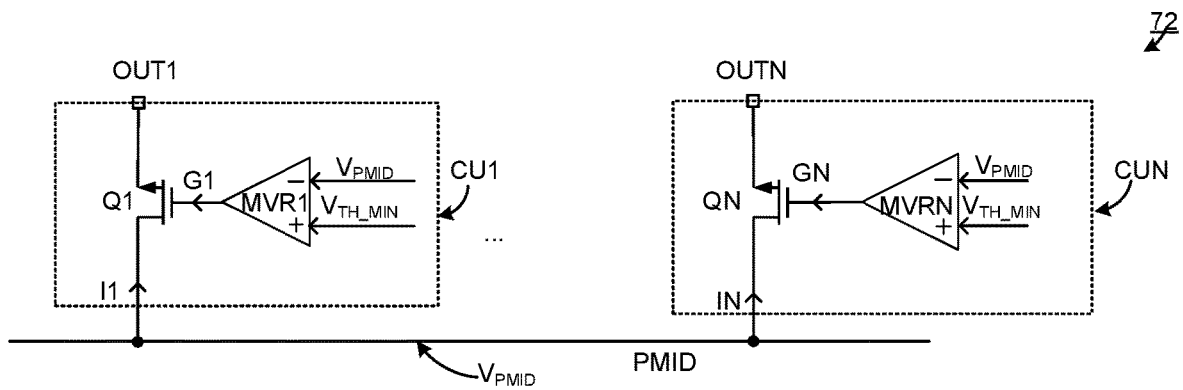

FIG. 7b illustrates the charging module 12 of the electric system 700 shown in FIG. 7a in accordance with an embodiment of the present invention.

Figure 8A:
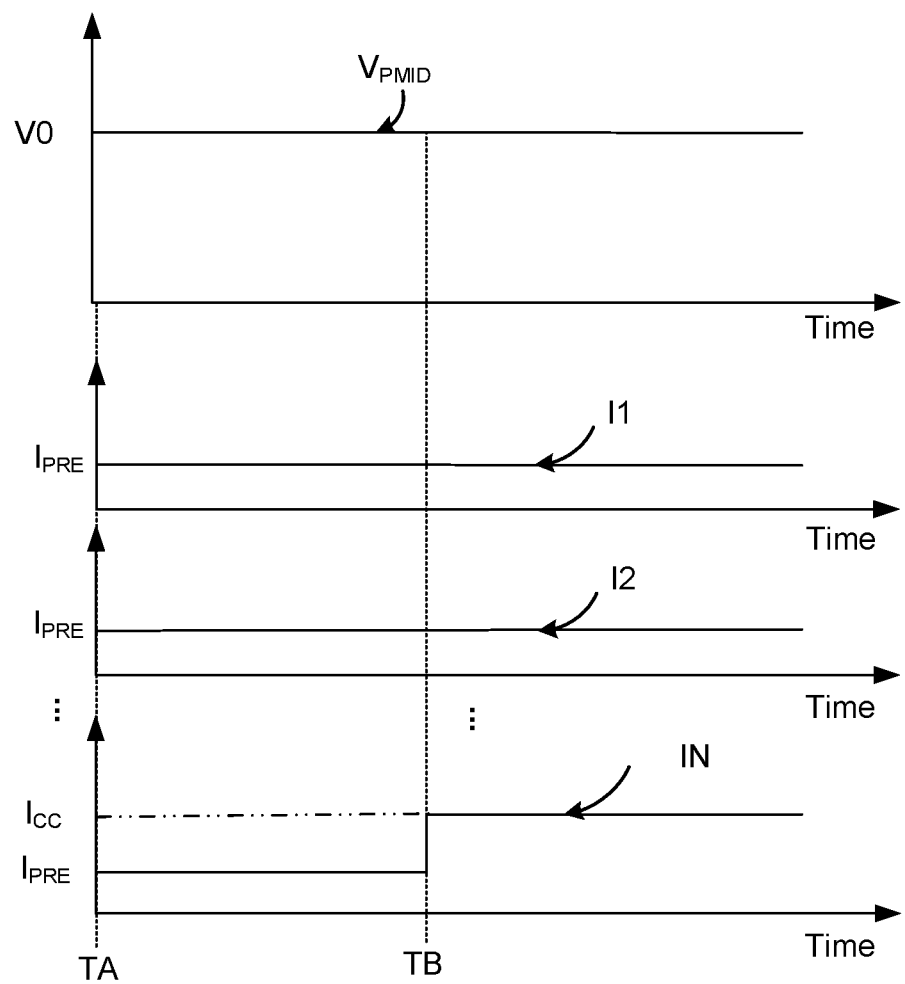

FIG. 8a illustrates the waveform diagrams of the boost output voltage $V_{PMID}$ and the N charging currents I1-IN shown in FIG. 7a in accordance with an embodiment of the present invention.

Figure 8B:
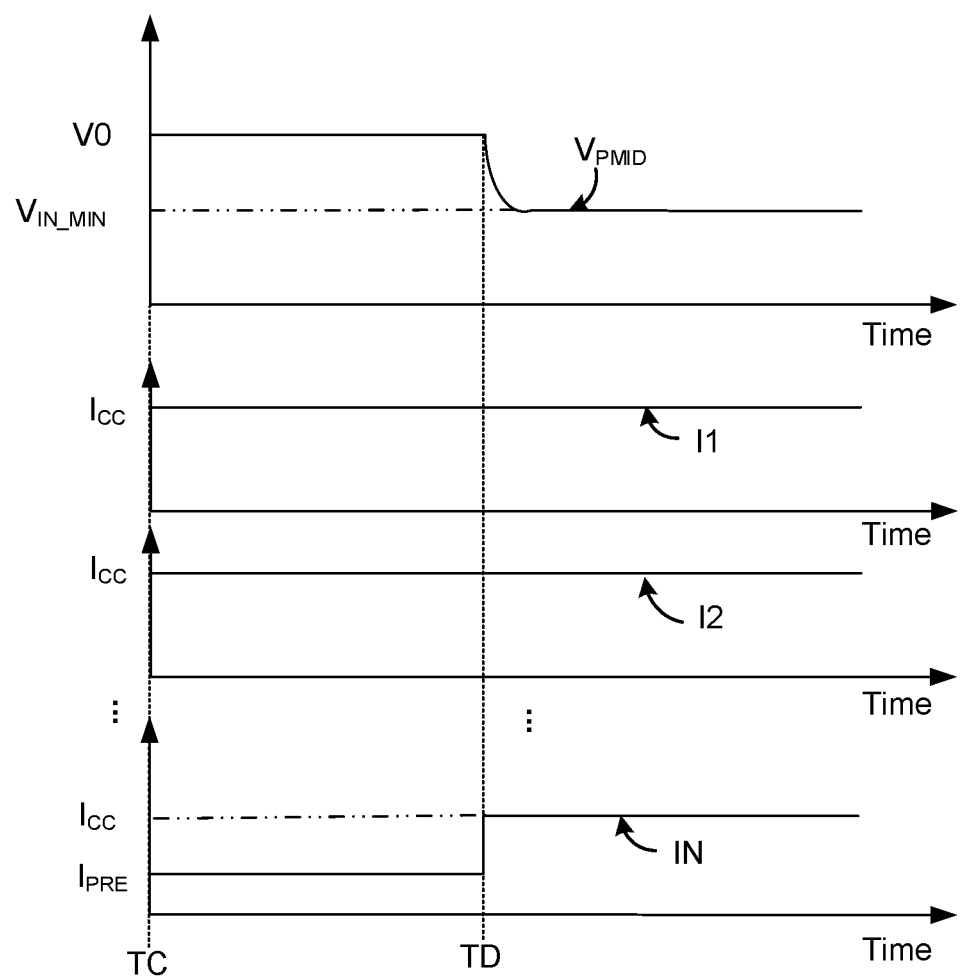

FIG. 8b illustrates waveform diagrams of the boost output voltage $V_{PMID}$ and the N charging currents I1-IN shown in FIG. 7a in accordance with another embodiment of the present invention.

Figure 9:
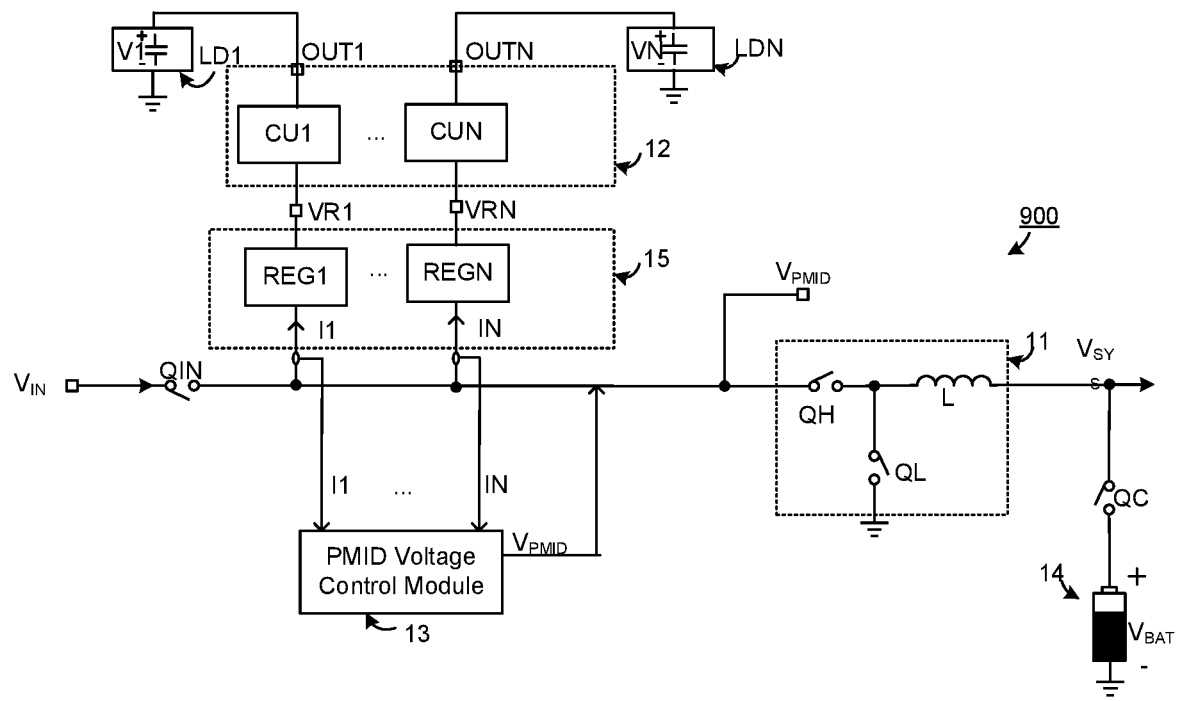

FIG. 9 illustrates a schematic diagram of an electric system 900 in accordance with an embodiment of the present invention.

Figure 10:
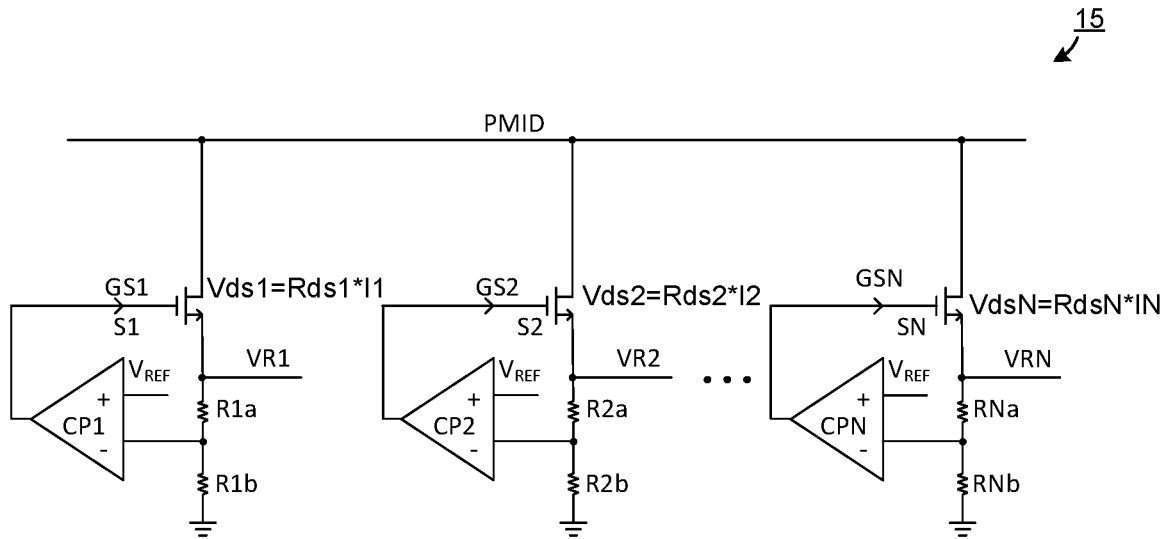

FIG. 10 illustrates a schematic diagram of the voltage regulation module 15 shown in FIG. 9 in accordance with an embodiment of the present invention.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

FIG. 1 illustrates a schematic diagram of an electric system 100 in accordance with an embodiment of the present invention. In the example embodiment of FIG. 1, the electric system 100 comprises an input terminal to receive an input voltage $V_{IN}$, a system output terminal SYS to provide a system voltage $V_{SYS}$ to a main battery 14, a plurality of charging output terminals OUT1-OUTN to charge a plurality of Loads LD1-LDN respectively, and a battery charging circuit, where N is an integer equal to or greater than 1. The battery charging circuit comprises an input switch QIN, a switching circuit 11, a charging module 12, a voltage control module 13 and a battery transistor QC. The input switch QIN has a first terminal to receive the input voltage $V_{IN}$, and a second terminal. The switching circuit 11 has a first terminal (PMID terminal) coupled to the second terminal of the input switch QIN and a second terminal coupled to the system output terminal SYS. The switching circuit 11 further comprises a high side switch QH, a low side switch QL and an inductor L. The high side switch QH has a first terminal coupled to the PMID terminal, and a second terminal. The low side switch QL has a first terminal coupled to the second terminal of the high side switch QH and a second terminal coupled to a reference ground. The inductor L has a first terminal coupled to the second terminal of the high side switch QH and the first terminal of the low side switch QL, and a second terminal coupled to the system output terminal SYS. The high side switch QH and the low side switch QL are controlled to be turned on or off complementarily by a switching control signal CTRL. The switching circuit 11 can work in a buck mode or a boost mode based on the specific value of the input voltage $V_{IN}$. The charging module 12 has a plurality of charging units CU1-CUN, wherein the charging unit CUi has a first terminal coupled to the PMID terminal and a second terminal coupled to the charging output terminal OUTi, wherein i is an integer in a range from 1 to N. The voltage control module 13 senses a plurality of charging currents I1-IN passing through the plurality of charging units CU1-CUN respectively, and adjusts a boost output voltage $V_{PMID}$ at the PMID terminal based on the plurality of charging currents I1-IN. The main battery 14 has a battery voltage $V_{BAT}$ and is coupled to the system output terminal SYS via the battery transistor QC. The load LDi has a load voltage Vi indicative of the state of the load LDi. In an embodiment, the load LDi is a battery cell, and the load voltage Vi is configured to indicate the charge state of the load LDi.

Figure 2:
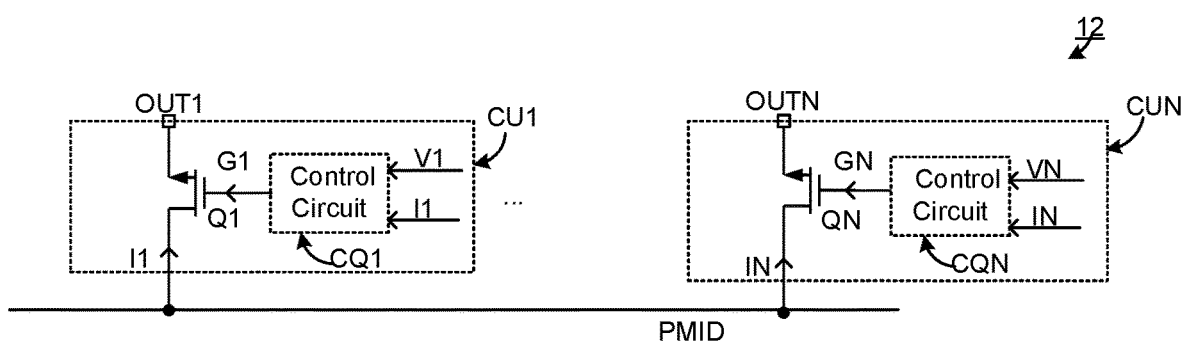
FIG. 2 illustrates the charging module 12 of the electric system 100 shown in FIG. 1 in accordance with an embodiment of the present invention.

FIG. 2 illustrates the charging module 12 of the electric system 100 shown in FIG. 1 in accordance with an embodiment of the present invention. In FIG. 2, the charging unit CUi comprises a charging transistor Qi and a control circuit CQi, wherein i is an integer in a range from 1 to N. The charging transistor Qi has a first terminal coupled to the PMID terminal, a second terminal coupled to the charging output terminal OUTi, and a control terminal. The control circuit CQi is configured to generate a control signal Gi to the control terminal of the charging transistor Qi based on the charging current Ii and the load voltage Vi. In FIG. 2, the charging unit CUi is configured to control a charging process of the load LDi, which can be split to a pre-charge stage, a fast charge stage, a constant voltage charge stage and a termination stage based on the specific state of the load LDi. More specifically, in the pre-charge stage, the charging current Ii is regulated at a pre-charge threshold current $I_{PRE}$ to charge the load LDi while in the fast charge stage, the charging current Ii is regulated at a fast charge threshold current $I_{CC}$ to charge the load LDi, wherein the pre-charge threshold current $I_{PRE}$ is lower than the fast charge threshold current $I_{CC}$. In an embodiment, each charging unit is a linear charger.

Figure 3:
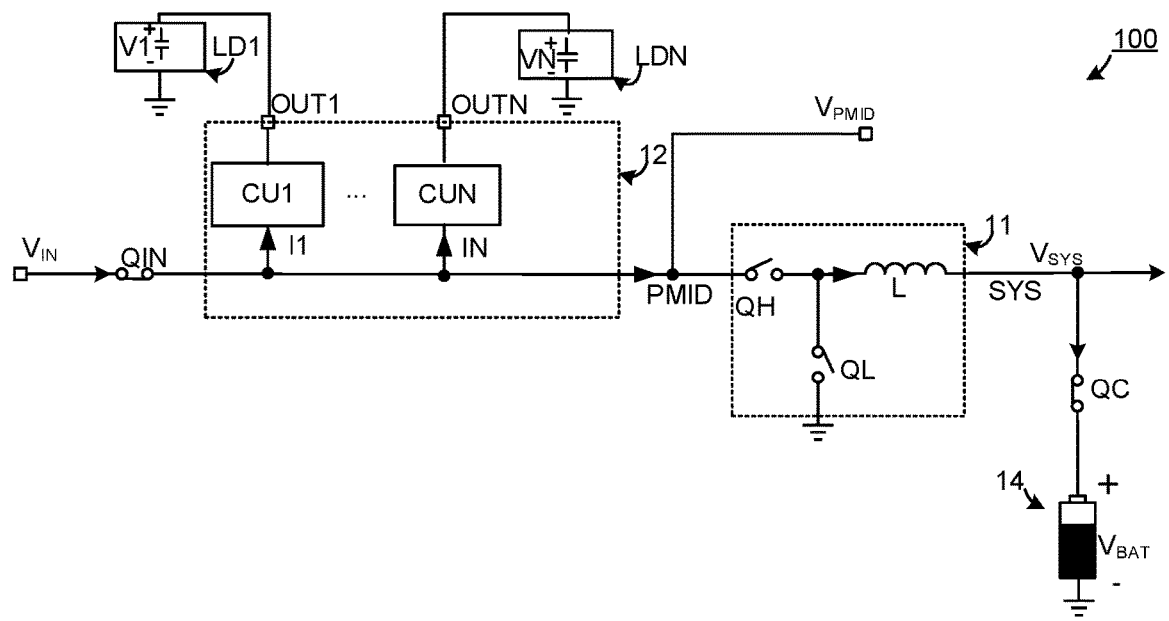
FIG. 3 illustrates the power transferring path of the electric system 100 when the input voltage $V_{IN}$ is higher than an under-voltage threshold $V_{UV}$.
Figure 4:
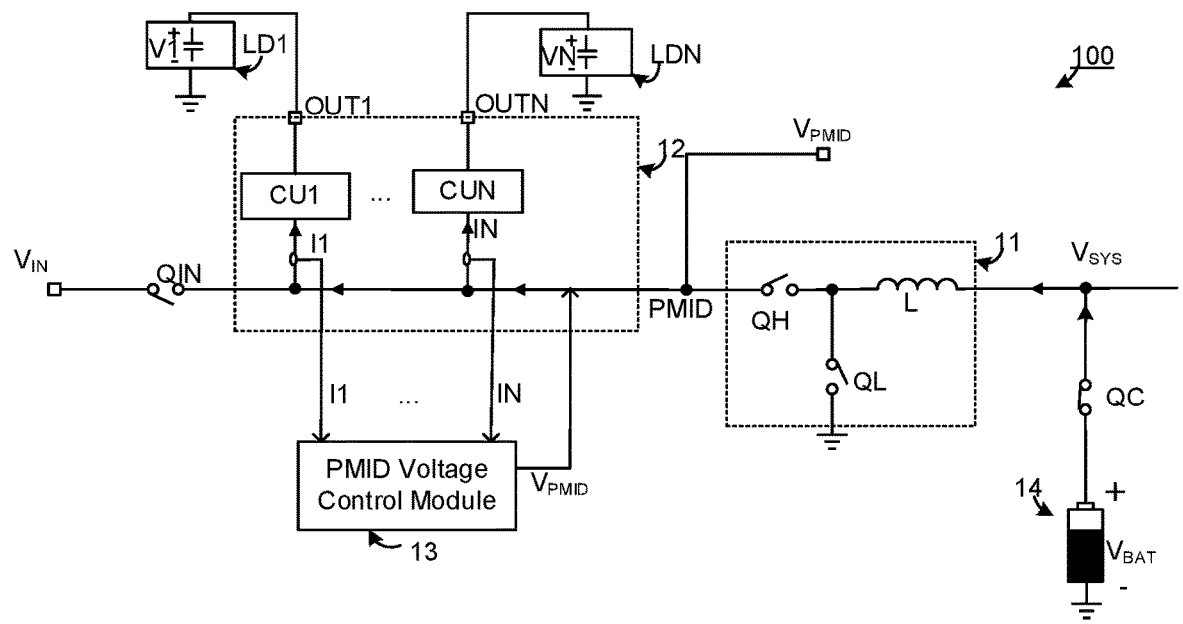
FIG. 4 illustrates the power transferring path of the electric system 100 when the input voltage $V_{IN}$ is lower than the under-voltage threshold $V_{UV}$ and the main battery 14 offers energy for the charging module 12 in accordance with an embodiment of the present invention.

Still referring to FIG. 1, the electric system 100 is a bi-directional charging system which can convert the input voltage $V_{IN}$ to the system voltage $V_{SYS}$ in a first direction and convert the battery voltage $V_{BAT}$ to the boost output voltage $V_{PMID}$ in a second direction based on the specific value of the input voltage $V_{IN}$, which may be better understood with reference to FIG. 3 and FIG. 4.

FIG. 3 illustrates the power transferring path of the electric system 100 when the input voltage $V_{IN}$ is higher than an under-voltage threshold $V_{UV}$. When the input voltage $V_{IN}$ is higher than the under-voltage threshold $V_{UV}$, the input switch QIN is controlled to be turned on, the input voltage $V_{IN}$ passes through the input switch QIN, the switching circuit 11 works in the buck mode to convert the input voltage $V_{IN}$ received at the PMID terminal (now the voltage at the PMID terminal is substantially equal to the input voltage $V_{IN}$) to the system voltage $V_{SYS}$ to charge the main battery 14 via the battery transistor QC. In addition, the charging module 12 is powered by the input voltage $V_{IN}$ received at the PMID terminal.

FIG. 4 illustrates the power transferring path of the electric system 100 when the input voltage $V_{IN}$ is lower than the under-voltage threshold voltage $V_{UV}$ and the main battery 14 offers energy for the charging module 12 in accordance with an embodiment of the present invention. When the input voltage $V_{IN}$ is lower than the under-voltage threshold voltage $V_{UV}$, the main battery 14 provides the battery voltage $V_{BAT}$ to the system output terminal SYS through the battery transistor QC, the switching circuit 11 works in the boost mode to convert the battery voltage $V_{BAT}$ received at the system output terminal SYS to the boost output voltage $V_{PMID}$ at the PMID terminal to power the charging module 12. In an embodiment, when the input voltage $V_{IN}$ is lower than the under-voltage threshold voltage $V_{UV}$, the input switch QIN may be controlled to be turned on when it is required to transfer energy from the main battery 14 to the input terminal of the electric system 100 or may be controlled to be turned off when it is not required to transfer energy from the main battery 14 to the input terminal of electric system 100.

FIG. 5 illustrates a flowchart of a method 500 used by the PMID voltage control module 13 of the electric system 100 shown in FIG. 1 in accordance with an embodiment of the present invention. The flowchart of the method 500 will be explained with reference to the electric system 100 shown in FIG. 4. In the example of FIG. 5, the method 500 comprises steps 501-507. In step 501, setting the boost output voltage $V_{PMID}$ to be an initial voltage V0. The initial voltage V0 may be higher than a termination charging threshold voltage $V_{FULL}$ indicative of each of the plurality of loads LD1-LDN being in a full-charged condition. For example, if the load LDi is a Li-Ion or a Li-polymer battery cell, the termination charging threshold voltage $V_{FULL}$ of the Li-Ion or the Li-polymer battery cell is about 4.2V, so it is suitable for the initial voltage V0 to be in a range of 4.5V to 5.5V, wherein i is an integer in a range from 1 to N. In another embodiment, the initial voltage V0 has a programmable value that can meet specific requirement of the plurality of loads LD1-LDN. In step 502, sensing a plurality of charging currents I1-IN passing through the plurality of charging units CU1-CUN respectively, and comparing the plurality of charging currents I1-IN with the pre-charge threshold current $I_{PRE}$. If all the plurality of charging currents I1-IN are higher than the pre-charge threshold current $I_{PRE}$, go to step 503, and if not, continue comparing the plurality of charging currents I1-IN with the pre-charge threshold current $I_{PRE}$, and the boost output voltage $V_{PMID}$ is regulated at the initial voltage V0. In step 503, comparing all the plurality of charging currents I1-IN with the fast charge threshold current $I_{CC}$. If one or more of the plurality of charging currents I1-IN are lower than the fast charge threshold current $I_{CC}$, go to step 504 of controlling the boost output voltage $V_{PMID}$ to increase by a voltage increment VD1, and if not, go to step 505 of controlling the boost output voltage $V_{PMID}$ to decrease by a voltage decrement VD2. The method 500 further comprises step 506 of delaying for a first time period T1 and going back to step 503 after the boost output voltage $V_{PMID}$ is controlled to increase in step 504. The method 500 also further comprises step 507 of delaying for a second time period T2 and going back to step 503 after the boost output voltage $V_{PMID}$ is controlled to decrease in step 505. It is should be understood that, the first time period T1 may be equal to the second time period T2 or not.

FIG. 6 illustrates the waveform diagrams of a series of signals of the method 500 in FIG. 5. Specifically, FIG. 6 illustrates the waveform diagram of the boost output voltage $V_{PMID}$ of the method 500 after the boost output voltage $V_{PMID}$ is set to be the initial voltage V0 in accordance with an embodiment of the present invention. In FIG. 6, the waveform diagrams of the plurality of charging currents I1-IN are also illustrated for better understanding the steps of the method 500. In FIG. 6, the boost output voltage $V_{PMID}$ is set to be the initial voltage V0 at the moment Ta, and the plurality of charging currents I1-IN are sensed and compared with the pre-charge threshold current $I_{PRE}$, Then at the moment Tb because all the plurality of charging currents I1-IN (all the plurality of charging currents I1-IN are equal to the fast charge threshold current $I_{CC}$) are higher than the pre-charge threshold current $I_{PRE}$, so all the plurality of charging currents I1-IN are continued to be compared with the fast charge threshold current $I_{CC}$. At the moment Tb, the plurality of charging currents I1-IN are equal to the fast charge threshold current $I_{CC}$, so the boost output voltage $V_{PMID}$ is controlled to decrease by the voltage decrement VD2. The plurality of charging currents I1-IN maintain at the fast charge threshold current $I_{CC}$ until the moment Td when the charging current Ii (i=N in FIG. 6) decreases to be lower than the fast charge threshold current $I_{CC}$, so the boost output voltage $V_{PMID}$ is controlled to repeat the decrease of the voltage decrement VD2 with a delay of the second time period T2 from the moment Tb to the moment Tc. At the moment Td, the charging current IN is lower than the fast charge threshold current $I_{CC}$, so after a delay of the second time period T2 from the moment Tc, the boost output voltage $V_{PMID}$ is controlled to increase by the voltage increment VD1 at the moment Te. At the moment Tf (the first time period T1 delay from the moment Te), the charging current IN is still lower than the fast charge threshold current $I_{CC}$, so the boost output voltage $V_{PMID}$ is controlled to increase by the voltage increment VD1 again. By the operation illustrated above, the boost output voltage $V_{PMID}$ is controlled to decrease or increase based on the plurality of charging currents I1-IN. More specifically, the boost output voltage $V_{PMID}$ is controlled to decrease or increase by comparing the plurality of charging currents I1-IN with the pre-charge threshold current $I_{PRE}$ and the fast charge threshold current $I_{CC}$. It should be understood that although the voltage increment VD1 shown in FIG. 6 is higher than the voltage decrement VD2, the voltage increment VD1 may be equal to or lower than the voltage decrement VD2 in another embodiment.

FIG. 7a illustrates an electric system 700 with a schematic diagram of the voltage control module 73 in accordance with an embodiment of the present invention, In the example embodiment of FIG. 7a, the voltage control module 73 comprises a minimum current selection circuit MUX, a voltage control amplifier COM1, a current control amplifier COM2 and a switching control circuit. The minimum current selection circuit MUX has a plurality of input terminals to receive the plurality of charging currents I1-IN respectively, and an output terminal to provide a minimum current $I_{MIN}$ to the current control amplifier COM2, wherein the minimum current $I_{MIN}$ is the minimum one of the plurality of charging currents I1-IN. The voltage control amplifier COM1 has a first input terminal to receive a reference voltage $V_{REF\_PMID}$, a second input terminal to receive a feedback voltage $V_{FB\_PMID}$ indicative of the boost output voltage $V_{PMID}$, and an output terminal configured to provide a first error signal $ERR_V$. The voltage control amplifier COM1 is configured to provide the first error signal $ERR_V$ to control the switching circuit 11 to provide the boost output voltage $V_{PMID}$ regulated at an initial voltage V0 determined by the reference voltage $V_{REF\_PMID}$. The current control amplifier COM2 has a first input terminal coupled to the output terminal of the minimum current selection circuit MUX to receive the minimum current $I_{MIN}$, a second input terminal to receive a fast charge reference current $I_{REF\_CC}$, and an output terminal configured to provide a second error signal $ERR_C$. The current control amplifier COM2 is configured to provide the second error signal $ERR_C$ to control the switching circuit 11 to provide a boost current IB determined by the fast charge reference current $I_{REF\_CC}$. The switching control circuit is configured to generate the switching control signal CTRL to control the on or off of the high side switch QH and the low side switch QL of the switching circuit 11 based on the first error signal $ERR_V$ or the second error signal $ERR_C$. When the minimum current $I_{MIN}$ is lower than the fast charge threshold current $I_{CC}$, the voltage control amplifier COM1 takes effect, the switching control signal CTRL is configured to generated base on the first error signal $ERR_V$, and the switching circuit 11 is controlled to provide the boost output voltage $V_{PMID}$ regulated at the initial voltage V0. When the minimum one of the plurality of charging currents I1-IN is higher than or equal to the fast charge threshold current $I_{CC}$ (for example, the N charging units exit from the pre-charge stage and enter to the fast charge stage), the current control amplifier COM2 takes effect and the switching circuit 11 is controlled to provide the boost current IB determined by the fast charge reference current $I_{REF\_CC}$ for the N charging units CU1-CUN.

FIG. 7b illustrates the charging module 72 of the electric system 700 shown in FIG. 7a in accordance with an embodiment of the present invention. The charging unit CUi comprises an input minimum regulation circuit MVRi configured to regulate the boost output voltage $V_{PMID}$ to be an input minimum regulation voltage $V_{IN\_MIN}$ when the switching circuit 11 is controlled to provide the boost current IB determined by the fast charge reference current $I_{REF\_CC}$ for the N charging units CU1-CUN, wherein i is an integer in a range from 1 to N. The input minimum regulation circuit MVRi has a first input terminal to receive the boost output voltage $V_{PMID}$, a second input terminal to receive the minimum threshold voltage $V_{TH\_MIN}$, and an output terminal. When the boost current IB determined by the fast charge reference current $I_{REF\_CC}$ is provided to the N charging units CU1-CUN, the input minimum regulation circuit MVRi is configured to regulate the boost output voltage $V_{PMID}$ to be the input minimum regulation voltage $V_{IN\_MIN}$. For example, in an electric system with N=2, the pre-charge threshold current $I_{PRE}$ is 0.3 A, the fast charge threshold current $I_{CC}$ is 1 A. When the charging current I1 is 0.5 A and the charging current I2 is 0.2 A, so the minimum current $I_{MIN}$ ($I_{MIN}$=0.2 A) is less than the fast charge threshold current $I_{CC}$, the voltage control amplifier COM1 takes effect, the boost output voltage $V_{PMID}$ is regulated to be the initial voltage V0, and when the charging current I1 increases from 0.5 A to 1 A, and the charging current I2 increases from 0.2 A to 1 A, the minimum current $I_{MIN}$ ($I_{MIN}$=1 A) is equal to the fast charge threshold current $I_{CC}$($I_{CC}$=1 A), so the current control amplifier COM2 takes effect, the switching circuit 11 is controlled to provide the boost current IB (IB=2 A) to the charging unit CU1 and the charging unit CU2, and the input minimum regulation circuit MVR1 and the input minimum regulation circuit MVR2 are configured to regulate the boost output voltage $V_{PMID}$ to be the input minimum regulation voltage $V_{IN\_MIN}$, thus the boost output voltage $V_{PMID}$ is controlled to decrease from the initial voltage V0 to the input minimum regulation voltage $V_{IN\_MIN}$. In an embodiment, the input minimum regulation voltage $V_{IN\_MIN}$ is user definable. In an embodiment, the input minimum regulation voltage $V_{IN\_MIN}$ may be programmed by an integrated I²C control interface.

FIG. 8a illustrates a waveform diagram of the boost output voltage $V_{PMID}$ shown in FIG. 7a in accordance with an embodiment of the present invention. In FIG. 8a, the waveform diagrams of the plurality of charging currents I1-IN are also illustrated for better understanding the operating principle of the voltage control module 13. In FIG. 8a, from moment TA to moment TB, the plurality of charging currents I1-IN are equal to the pre-charge threshold current $I_{PRE}$, so the boost output voltage $V_{PMID}$ is regulated to be the initial voltage V0. At the moment TB, the load LDi (take i=N for example in FIG. 8a) exits from the pre-charge stage and enters to the fast charge stage, the corresponding charging current IN increases from the pre-charge threshold current $I_{PRE}$ to the fast charge threshold current $I_{CC}$, for the minimum current $I_{MIN}$ ($I_{MIN}$=$I_{PRE}$) is lower than the fast charge threshold current $I_{CC}$, so the voltage control amplifier COM1 takes effect, and the boost output voltage $V_{PMID}$ is regulated to be the initial voltage V0.

FIG. 8b illustrates waveform diagram of the boost output voltage $V_{PMID}$ shown in FIG. 7a in accordance with another embodiment of the present invention. In FIG. 8b, the waveform diagrams of the plurality of charging currents I1-IN are also illustrated for better understanding the operating principle of the voltage control module 73. In FIG. 8b, from moment TC to moment TD, except the charging current IN, the charging currents I1-I(N−1) are equal to the fast charge threshold current $I_{CC}$, so the boost output voltage $V_{PMID}$ is regulated at the initial voltage V0. At the moment TD, the charging unit CUN exits from the pre-charge stage and enters to the fast charge stage, and the corresponding charging current IN increases from the pre-charge threshold current $I_{PRE}$ to the fast charge threshold current $I_{CC}$, so the current control amplifier COM2 take effect, and the boost output voltage $V_{PMID}$ is controlled by the input minimum regulation circuits MVRN-MVRN to decrease from the initial voltage V0 to the input minimum regulation voltage $V_{IN\_MIN}$.

FIG. 9 illustrates a schematic diagram of an electric system 900 in accordance with an embodiment of the present invention. The electric system 900 further comprises a regulation module 15 compared with the electric system 100 shown in FIG. 1. The regulation module 15 has a plurality of regulation units REG1-REGN coupled between the PMID terminal and the charging module 12. The regulation unit REGi has a first terminal coupled to the PMID terminal, and a second terminal to provide a regulation output voltage VRi for the corresponding charging unit CUi, wherein i is an integer in a range from 1 to N. When the input voltage $V_{IN}$ is higher than the under-voltage threshold voltage $V_{UV}$, the regulation unit REGi can work in a switch mode or a regulation mode depending on whether the input voltage $V_{IN}$ is higher than an over voltage threshold voltage $V_{OV}$ or not, wherein the over voltage threshold voltage $V_{OV}$ is higher than the under-voltage threshold voltage $V_{UV}$. If the input voltage $V_{IN}$ is lower than the over voltage threshold voltage $V_{OV}$, the regulation unit REGi works in the switch mode, the regulation output voltage VRi is controlled to vary with the input voltage $V_{IN}$ received at the PMID terminal. If the input voltage $V_{IN}$ is higher than the over voltage threshold voltage $V_{OV}$, the regulation unit REGi works in the regulation mode, the regulation output voltage VRi is regulated at a preset voltage. In an embodiment, the preset voltage is in a range from 4V to 9V.

FIG. 10 illustrates a schematic diagram of the voltage regulation module 15 shown in FIG. 9 in accordance with an embodiment of the present invention. In FIG. 10, the regulation unit REGi comprises a regulation transistor Si, an operational amplifier CPi having a first input terminal to receive a regulation threshold voltage $V_{REF}$ and a second input terminal, a first regulation resistor Ria and a second regulation resistor Rib, wherein i is an integer in a range from 1 to N. The regulation transistor Si has a first terminal coupled to the PMID terminal, a second terminal to provide the regulation output voltage VRi and a control terminal to receive a gate signal GSi. The first regulation resistor Ria and the second regulation resistor Rib are coupled in series between the second input terminal of the regulation transistor Si and the reference ground, and have a common node coupled to the second terminal of the operational amplifier CPi. When the regulation unit REGi works in the switch mode, the regulation transistor Si works in the linear region (full conduction region), the regulation transistor Si may operate as a switch element that can perform on or off switching. When the regulation transistor Si is switched on, an on resistance Rdsi between its first terminal and its second terminal may be substantially constant and relatively small. Assuming the on resistance Rdsi of the regulation transistor Si operating in the linear region is 10 mΩ, if the charging current Ii is 0.1 A, a transistor voltage drop Vdsi across the first terminal and the second terminal of the regulation transistor Si would be Vdsi=Rdsi*Ii=10 mΩ*0.1 A=1 mV, the regulation output voltage VRi is controlled to vary with the boost output voltage $V_{PMID}$. When the regulation unit REGi works in the regulation mode, the regulation transistor Si works in the saturation regulation, and the regulation output voltage VRi is regulated to the preset voltage, and does not vary with the boost output voltage $V_{PMID}$.

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. An electric system, having an input terminal to receive an input voltage, a system output terminal to provide a system voltage, and N charging output terminals coupled to N loads respectively, wherein N is an integer greater than 1, the electric system comprising:
   an input switch coupled between the input terminal and a first terminal;
   a switching circuit, coupled between the first terminal and the system output terminal, wherein the switching circuit is configured to work in a buck mode to convert a boost output voltage at the first terminal to the system voltage, or to work in a boost mode to convert the system voltage to the boost output voltage;
   N charging units, wherein for each integer i from 1 to N, the $i^{th}$ charging unit of the N charging units has an input terminal coupled to the first terminal, and an output terminal coupled to the $i^{th}$ charging output terminal of the N charging output terminals for charging the $i^{th}$ load of the N loads; and
   a voltage control module, having N input terminals coupled to the N charging units respectively, wherein the voltage control module is configured to sense N charging currents passing through the N charging units respectively, and to adjust the boost output voltage based on the N charging currents, wherein when the N charging currents are higher than or equal to a fast charge threshold current, the boost output voltage is controlled to decrease from an initial voltage.

2. The electric system of claim 1, wherein when the input voltage is higher than an under-voltage threshold voltage, the input switch is turned on and the switching circuit is configured to work in the buck mode.

3. The electric system of claim 1, wherein when the input voltage is less than an under-voltage threshold voltage, the switching circuit is configured to work in the boost mode.

4. The electric system of claim 1, wherein when at least one of the N charging currents is lower than or equal to a pre-charge threshold current, the boost output voltage is regulated to be the initial voltage.

5. The electric system of claim 1, wherein each charging unit is a linear charger.

6. The electric system of claim 1, further comprising N regulation units for providing N regulation output voltages respectively, wherein for each i from 1 to N, the $i^{th}$ regulation unit of the N regulation units has an input terminal coupled to the first terminal, and an output terminal coupled to the input terminal of the $i^{th}$ charging unit for providing the $i^{th}$ regulation output voltage of the N regulation output voltages, wherein when the boost output voltage is lower than an over voltage threshold voltage, the $i^{th}$ regulation output voltage is regulated to vary with the boost output voltage, and when the boost output voltage is higher than the over voltage threshold voltage, the $i^{th}$ regulation output voltage is regulated at a preset voltage.

7. The electric system of claim 6, wherein each regulation unit comprises a regulation transistor, and when the boost output voltage is lower than the over voltage threshold voltage, the regulation transistor works in a linear region.

8. The electric system of claim 1, wherein when the a minimum one of the N charging currents is lower than the fast charge threshold current, the boost output voltage is regulated to be the initial voltage, and when the minimum one of the N charging currents is higher than or equal to the fast charge threshold current, the boost output voltage is controlled to decrease from the initial voltage.

9. The electric system of claim 8, wherein the voltage control module comprises:
- a minimum current selection circuit, having N input terminals to respectively receive the N charging currents, and an output terminal to provide the minimum one of the N charging currents;
- a voltage control amplifier, having a first input terminal to receive a reference voltage, a second input terminal to receive a feedback voltage indicative of the boost output voltage, and an output terminal to provide a first error signal based on the reference voltage and the feedback voltage;
- a current control amplifier, having a first input terminal to receive the minimum one of the N charging currents, a second input terminal to receive a fast charge reference current, and an output terminal to provide a second error signal based on the fast charge reference current and the minimum one of the N charging currents; and
- a switching control circuit, configured to receive the first error signal and the second error signal, and to generate a switching control signal to control the switching circuit based on the first error signal or the second error signal;
- wherein when the minimum one of the N charging currents is lower than the fast charge threshold current, the switching circuit is controlled by the first error signal to regulate the boost output voltage to be the initial voltage, and when the minimum one of the N charging currents is higher than or equal to the fast charge threshold current, the switching circuit is controlled by the second error signal to provide a boost current determined by the fast charge reference current to the N charging units.

10. The electric system of claim 9, wherein each charging unit comprises an input minimum regulation circuit, and when the switching circuit is controlled by the second error signal to provide the boost current determined by the fast charge reference current to the N charging units, the boost output voltage is regulated by the minimum regulation circuit to be an input minimum regulation voltage.

11. A method for controlling an electric system, wherein the electric system has an input terminal to receive an input voltage, a system output terminal to provide a system voltage, an input switch coupled between the input terminal and a first terminal, and a switching circuit coupled between the first terminal and the system output terminal, the switching circuit works in a buck mode to convert a boost output voltage at the first terminal to the system voltage or works in a boost mode to convert the system voltage to the boost output voltage at the first terminal, the electric system further has N charging units for charging N loads respectively, wherein N is an integer greater than 1, and for each i from 1 to N, wherein i is an integer in a range from 1 to N, the $i^{th}$ charging unit has an input terminal coupled to the first terminal, and an output terminal coupled to $i^{th}$ load of the N loads, the method comprising the steps of:
- setting the boost output voltage to be an initial voltage;
- sensing N charging currents passing through the N charging units respectively; and
- adjusting the boost output voltage based on the N charging currents, wherein when the N charging currents are higher than a fast charge threshold current, the boost output voltage is controlled to decrease from the initial voltage.

12. The method of claim 11, wherein the initial voltage is higher than a termination charging threshold voltage indicative of each of the N loads being in a full-charged condition.

13. The method of claim 11, wherein the step of adjusting the boost output voltage based on the N charging currents comprises regulating the boost output voltage to the initial voltage when at least one of the N charging currents is lower than or equal to a pre-charge threshold current.

14. The method of claim 13, wherein the step of adjusting the boost output voltage based on the N charging currents further comprises: when the N charging currents are higher than or equal to the fast charge threshold current, the boost output voltage is controlled to decrease by a voltage decrement, and when one of the N charging currents is lower than the fast charge threshold current, the boost output voltage is controlled to increase by a voltage increment.

15. The method of claim 14, the voltage increment is equal to the voltage decrement.

16. The method of claim 14, the voltage decrement is in a range from 10 mV to 200 mV.

\* \* \* \* \*